United States Patent [19]

Kemp

[11] 4,245,070
[45] Jan. 13, 1981

[54] METHOD OF POLYMERIZING VINYL CHLORIDE IN SEEDED MICROSUSPENSION

[75] Inventor: Thomas Kemp, Levallois-Perret, France

[73] Assignee: Rhone-Poulenc Industries, Paris, France

[21] Appl. No.: 914,352

[22] Filed: Jun. 12, 1978

Related U.S. Application Data

[63] Continuation of Ser. No. 679,654, Apr. 23, 1976, abandoned.

[30] Foreign Application Priority Data

Apr. 30, 1975 [FR] France .............................. 75 13582
Mar. 19, 1976 [FR] France .............................. 76 08025

[51] Int. Cl.² .......................... C08F 4/02; C08F 14/06; C08F 259/04
[52] U.S. Cl. ............................. 526/75; 260/29.6 MQ; 525/317; 526/225; 526/344.2; 526/909; C08F/2/16
[58] Field of Search ................ 526/75, 81, 344.2, 345, 526/225

[56] References Cited

U.S. PATENT DOCUMENTS

| | | | |
|---|---|---|---|
| 3,725,367 | 4/1973 | Kemp | 526/344.2 X |
| 3,875,130 | 4/1975 | Kemp | 526/344.2 |
| 3,879,364 | 4/1975 | Kemp | 526/344.2 X |
| 4,091,197 | 5/1978 | Fischer | 526/91 |

*Primary Examiner*—C. A. Henderson
*Attorney, Agent, or Firm*—McDougall, Hersh & Scott

[57] ABSTRACT

A method for preparing polymers of vinyl chloride in which polymerization of the corresponding monomer or monomers is carried out in microsuspension in the presence of a seeding product in the form of a dispersion of particles of a vinyl polymer previously prepared by polymerization in microsuspension, the particles of which contain at least one organic soluble initiator, without any complementary addition of initiator and in the presence of one or more other seeding products in the form of dispersion of vinyl polymer, the sizes of which differ from one another and from the particles of the first seeding product.

16 Claims, No Drawings

METHOD OF POLYMERIZING VINYL CHLORIDE IN SEEDED MICROSUSPENSION

This is a continuation, of application Ser. No. 679,654, filed Apr. 23, 1976 now abandoned.

BACKGROUND OF THE INVENTION

The invention relates to a method of preparing polyvinyl chloride and copolymers of vinyl chloride by polymerization is seeded microsuspension. It also relates to the resultant polyvinyl chloride and copolymers.

Polymerization in microsuspension, or fine suspension, is understood as being polymerization, in the presence of initiators soluble in organic material, or at least one monomer dispersed by powerful mechanical means in an aqueous medium containing an emulsifier as stabilizer, in order to obtain a dispersion of particles of an average diameter less than 5 microns.

It is known, from French Pat. No. 1,485,547, to prepare polymers of vinyl chloride in microsuspension, in the presence of a seeding product containing all the initiator necessary for polymerization. However, when polymerization is carried out so as to obtain a latex with a polymer concentration of over 45%, the high viscosity of the medium necessitates slower agitation, owing to the mechanical instability of the latex formed. This slow agitation leads to a decrease in the coefficients of exchange, which means that the polymerizing time has to become longer.

Moreover when the polymers obtained are used to prepare plastisols, the plastisols are difficult to use because of their dilatance, i.e. the increase of their viscosity with the speed gradient, and because the minimum proportion of plasticizer that can be used is 50 parts per 100 of polymer.

It is also known that, in the case of polymers of vinyl chloride prepared by polymerization in emulsion, the use of a plastisol is improved if the polymer comprises elementary particles forming at least two populations which have particles of different sizes. This plurality of populations can be obtained by mixing several latices comprising particles of different sizes, but the mixture cannot be made at a high concentration. Another solution consists of simultaneously preparing the various populations of particles by polymerization in emulsion of at least one monomer in the presence of several seeding products prepared by polymerization in emulsion. However, this operation is very tricky, for the quantity of emulsifier used has to be stipulated and limited and its introduction requires special care, that is to say, a specific introduction all the time, in order to avoid nucleation of new particles which would limit the polymer concentration of the latex obtained. Moreover it is difficult to make seeding products with particles of very small sizes which are measured and homogeneous, since the slightest variation in particle size results in variation in the ratios of the dimensions and in the proportions of the various populations obtained after polymerization.

The method of the invention avoids these drawbacks and enables latices to be prepared by polymerization in microsuspension, without any limitations, precautions or difficulties; the latices having a polymer concentration well over 45% by weight, a low viscosity and a reproducible particle size. Furthermore, the polymers thus obtained are easy to convert and more particularly adapted to give plastisols which may contain very little plasticizer but which are nevertheless easy to use.

SUMMARY OF THE INVENTION

According to the invention, the method of preparing polymers of vinyl chloride comprises polymerizing the corresponding monomer or monomers in microsuspension, in the presence of a seeding product in the form of a dispersion of particles of a vinyl polymer previously prepared by polymerization in microsuspension, the particles of which contain at least one initiator soluble in organic material, without any complementary addition of initiator. The method is characterized in that polymerization is carried out in the presence of one or more other seeding products in the form of dispersions of particles of vinyl polymer, in which the sizes of the particles differ from one another and differ from that of the first seeding product; the particles may contain at least one initiator.

Polymers of vinyl chloride refer to polyvinyl chloride and to copolymers containing at least 50% by weight of vinyl chloride and at least one monomer which is copolymerizable with vinyl chloride. The copolymerizable monomers are those generally employed in conventional methods of copolymerizing vinyl chloride. Some examples are vinyl esters of mono- and poly-carboxylic acids, such as vinyl acetate, propionate and benzoate; unsaturated mono- and poly-carboxylic acids such as acrylic, methacrylic, maleic, fumaric and itaconic acid as well as their aliphatic, cycloaliphatic and aromatic esters, their amides and their nitriles; vinyl and vinylidene halides; alkyl vinyl ethers and olefins.

The vinyl polymers, which constitute seeding products, are represented by the polymers of vinyl chloride defined above and by homopolymers of the above-mentioned copolymerizable monomers, or copolymers formed by the said monomers.

The polymers of the various seeding products in one and the same operation may be identical or different.

The use of a vinyl polymer other than vinyl chloride as a seeding product may make it possible to improve certain mechanical properties or the suitability of the resultant polymers for processing such as extrusion or calendering.

The first seeding product necessary for polymerization is prepared by conventional methods of polymerization in microsuspension. It is in the form of a dispersion of particles of polymer with an average diameter from 0.05 to 1.5 μm and preferably from 0.2 to 1 μm.

A method of preparing the first seeding product comprises using water, a vinyl monomer or a mixture of vinyl monomers, an initiator soluble in organic material and an anionic emulsifier possibly associated with a non-ionic emulsifier. The monomer or monomers are finely dispersed in the water with the aid of a powerful mechanical means such as a colloid mill, a high speed pump, a vibrating agitator or an ultrasonic machine. The microsuspension is then heated under autogenous pressure and with moderate agitation to a temperature generally from 30° to 65° C. When the pressure has dropped, the reaction is stopped and the unconverted monomer or monomers are degassed.

The initiators which are soluble in organic material and which are to be used in preparing the seeding product are represented by organic peroxides such as diacyl peroxides; among these mention should be made of lauroyl, decanoyl and caproyl peroxides, tertiobutyl diethylperacetate, diethylhexyl percarbonate and diacetyl peroxide.

The choice of the initiator soluble in organic material depends on the speed at which it decomposes at the temperature used for the reaction. The initiator must in fact be reactive enough for normal quantities, of the order of 0.1 to 3% by weight relative to the monomer or mixture of monomers, to enable the seeding product to be prepared within periods of 4 to 20 hours. However, the decomposing speed of the initiator should not be too high, so that the quantity of initiator decomposed in preparing the seeding product is not more than half the quantity of initiator used. It is therefore important to select an initiator with a half-life time such that the proportion of initiator destroyed in preparing the seeding product is from 5 to 50% by weight of all the initiator used.

In cases where several of such initiators are used, it is advantageous to choose ones of different reactivity; the most reactive initiators are active chiefly during the preparation of the seeding product, whereas the less reactive initiators are active mainly during the seeded polymerization of the vinyl chloride or of the mixture of vinyl chloride and copolymerizable monomer.

The other seeding product or products are in the form of dispersions of particles of polymer, which may or may not contain an initiator; their average diameters, which differ from one another and from that of the first seeding product, are from 0.02 to 1.5 $\mu$m and preferably from 0.02 to 0.8 $\mu$m. For example, in cases where there are only two seeding products, the average diameter of the particles of the second seeding product is from 0.05 to 1.5 $\mu$m and preferably from 0.05 to 0.8 $\mu$m; and in cases where there are three seeding products, the average diameter of the particles of the second seeding product is from 0.05 to 1.5 $\mu$m and preferably from 0.05 to 0.8 $\mu$m, and the average diameter of the particles of the third seeding product is from 0.02 to 0.8 $\mu$m and preferably from 0.02 to 0.5 $\mu$m.

These dispersions of particles may be obtained by conventional methods of polymerization in microsuspension or in emulsion.

The preparation of the seeding product or products, other than the first one, when carried out by polymerization in microsuspension, takes place as described above, but there is a greater degree of homogenization if the particles to be obtained are very small. In the method of the invention it is generally more advantageous to use one or more seeding products, other than the first, which do not contain any initiator. They are then polymerized with a quantity of initiator such that at least 80% by weight of the initiator is destroyed during the reaction.

Preparation of the seeding product or products, other than the first one, when carried out by polymerization in emulsion, comprises using water, a vinyl monomer, either alone or associated with a copolymerizable monomer, a water-soluble initiator and an anionic emulsifier, possibly associated with a non-ionic emulsifier.

The size of the particles is regulated by the usual methods suitable for polymerization in emulsion, e.g. by carefully choosing the nature and quantity of emulsifier used, by using seeds and by adjusting the agitating speed.

The reaction mixture is heated under autogenous pressure and with moderate agitation to a temperature from 30° to 65° C. When the pressure has dropped, the reaction is stopped and the unconverted monomer or monomers are degassed.

The water-soluble initiators required for preparing these seeding products are generally represented by hydrogen peroxide, persulphates of alkali metals or of ammonium, possibly associated with water-soluble reducing agents, such as sulphites or bisulphites of alkali metals. The quantities used vary greatly, depending on the initiating system chosen and are just sufficient to insure polymerization within periods of 4 to 10 hours.

PREFERRED EMBODIMENTS OF THE INVENTION

In polymerization according to the invention, the total quantity of the various seeding products used must be such that the quantity of polymers contained therein is 1 to 50% by weight of the sum of vinyl chloride (with or without comonomer to be polymerized) plus seeding polymers. A quantity of over 50% of seeding polymers can be used but is of little interest, for it is then very large relative to the vinyl chloride or mixture of vinyl chloride and copolymerizable monomer, and the advantages of the invention are thus minimized. A quantity of less than 1% of seeding polymers is also of very little interest, for the quantity of reactive initiator contained in the first seeding polymer or in two or more seeding polymers is then very small and does not, in practice, enable the vinyl chloride or mixture of vinyl chloride and copolymerizable monomer to be polymerized. It is in fact the excess initiator in the first seeding polymer or in two or more seeding polymers that very effectively initiates polymerization of the vinyl chloride or mixture of vinyl chloride and copolymerizable monomer, by setting up a regular reaction speed, as was shown in French Pat. No. 1,485,547.

The proportion of the first seeding polymer to the other seeding polymer or polymers, which depends on the composition of the polymer to be obtained, is from 95/5 to 5/95.

Thus there are several possible ways of carrying out seeded polymerization. Some examples of these are:

Using a first seeding product, prepared by polymerization in microsuspension, in which the polymer particles contain an initiator soluble in organic material; either with a second seeding product, prepared by polymerization in emulsion or in microsuspension, in which the polymer particles, which are finer than those of the first seeding product, do not contain any initiator; or with a second seeding product, prepared by polymerization in microsuspension, in which the polymer particles, which are finer than those of the first seeding product, contain an initiator soluble in organic material.

Using a first seeding product, prepared by polymerization in microsuspension, in which the polymer particles contain an initiator soluble in organic material, with a second seeding product, prepared by polymerization in emulsion or in microsuspension, in which the polymer particles, which are finer than those of the first seeding product, do not contain any initiator; either with a third seeding product, prepared by polymerization in emulsion or in microsuspension, in which the polymer particles, which are finer than those of the second seeding product, do not contain any initiator; or with a third seeding product, prepared by polymerization in microsuspension, in which the polymer particles, which are finer than those of the second seeding product, contain an initiator which is soluble in organic material.

Using a first seeding product, prepared by polymerization in microsuspension, in which the polymer particles contain an initiator soluble in organic material, with a second seeding product, prepared by polymerization in microsuspension, in which the polymer particles, which are finer than those of the first seeding product, contain an initiator soluble in organic material; either with a third seeding product, prepared by polymerization in emulsion or in microsuspension, in which the polymer particles, which are finer than those of the second seeding product, do not contain any initiator; or with a third seeding product, prepared by polymerization in microsuspension, in which the polymer particles, which are finer than those of the second seeding product, contain an initiator which is soluble in organic material.

Using a first seeding product, prepared by polymerization in microsuspension, in which the polymer particles contain an initiator soluble in organic material, with a second seeding product, prepared by polymerization in emulsion or in microsuspension, in which the polymer particles, which are larger than those of the first seeding product, do not contain any initiator.

Using a first seeding product, prepared by polymerization in microsuspension, in which the polymer particles contain an initiator soluble in organic material; either with a second seeding product, prepared by polymerization in emulsion or in microsuspension, in which the polymer particles, which are larger than those of the first seeding product, do not contain any initiator; or with a second seeding product, prepared by polymerization in microsuspension, in which the polymer particles, which are larger than those of the first seeding product, contain an initiator soluble in organic material; and with a third seeding product, prepared by polymerization in emulsion or in microsuspension, in which the polymer particles, which are larger than those of the second seeding product, do not contain any initiator.

Using a first seeding product, prepared by polymerization in microsuspension, in which the polymer particles contain an initiator soluble in organic material; with a second seeding product, prepared by polymerization in emulsion or in microsuspension, in which the polymer particles, which are finer than those of the first seeding product, do not contain any initiator; and with a third seeding product, prepared by polymerization in emulsion or in microsuspension, in which the polymer particles, which are larger than those of the first seeding product, do not contain any initiator.

In a preferred embodiment, a seeding product, prepared by polymerization in microsuspension, in which the polymer particles contain an initiator, is used with a seeding product prepared by polymerization in emulsion, in which the polymer particles, which are finer than those of the first seeding product, do not contain any initiator.

The proportions of seeding products relative to one another and the total quantity of seeding products are selected so that the quantity of organo-soluble initiator present in the particles of polymer is sufficient to effect polymerization or copolymerization without any complementary addition of initiator.

The quantity of water required for polymerization according to the invention must be such that the initial polymer concentration of the seeding products plus the vinyl chloride, with or without copolymerizable monomer, is from 20 to 80% and preferably 45 to 75% by weight of the reaction mixture, allowing for the water content of the seeding products.

In order to improve the stability of the microsuspension, it may be advantageous to add, before and/or during polymerization, at least one anionic emulsifier, possibly associated with at least one non-ionic emulsifier. The anionic emulsifiers are preferably soaps of fatty acids, alkyl sulphates, alkyl sulphonates, alkyl aryl sulphonates, vinyl sulphonates, allyl sulphonates, alkyl sulphosuccinates and alkaline alkyl phosphates; the non-ionic emulsifiers are preferably polycondensates of ethylene or propylene oxide on various hydroxylated organic compounds. The emulsifier may be the same as that or those used in the preparation of the seeding products.

The quantities of emulsifier may be up to 3% by weight of the vinyl chloride or mixture of vinyl chloride and copolymerizable monomer. These are the quantities generally employed to obtain a useful effect in the reaction. However, quantities outside the above limits could be used without going beyond the scope of the invention, since the only function of the emulsifiers is to stabilize the microsuspension and they have no effect on the size of the particles.

The reaction medium is heated under autogenous pressure to the polymerization temperature determined by the properties of the desired vinyl chloride polymer, depending on the molecular weights. The temperature is generally from 10° to 85° C. and preferably from 30° to 70° C.

In order to accelerate polymerization it is recommended to activate the initiator, included in the particles of the first seeding product and/or of the other seeding products, with a metal complex which is soluble in organic material and which is formed throughout the polymerization process by reaction between a water-soluble metal salt and a complexing agent which is introduced gradually, as described in U.S. application Ser. No. 476,050, filed June 3, 1974 (now abandoned), which has materialized in U.S. Pat. No. 4,019,197 issued on application Ser. No. 637,938 filed as a continuation of application Ser. No. 476,050. The metal salt is employed in quantities such that the molar ratio of metal salt is initiator is from 0.1 to 10/1. The metal of the salt is represented by iron, copper, cobalt, nickel, zinc, tin, titanium, vanadium, manganese, chromium and silver. The complexing agent is represented by mono- or polycarboxylic and alkyl phosphoric acids; lactones; ketones and carbazones. It is used in proportions which may reach molar stoichiometry relative to the metal salt.

The process of polymerization in microsuspension, as described above, may obviously be carried out continuously.

Apart from the important advantages of the invention such as: minimal consumption of initiator; a reaction which is more regular and possibly shorter than in conventional processes; and virtually no incrustation of the reaction zone, thus facilitating the heat exchanges which are necessary to obtain uniform polymerization, there are also more particular advantages: viz. that the invention gives a microsuspension with a high polymer concentration of up to 75% by weight and with great fluidity; this gives a concentration of 20 to 75% by weight; resulting in better exploitation of the polymerizing and separating means; and that it leads to exceptional reproducibility of the sizes of particles contained in the latex obtained.

Latices thus prepared contain at least two populations of particles of different average diameters. Thus, when two seeding products are used, the two populations obtained have average diameters which, for the larger particles, range from 0.4 to 2.5 μm and, for the finer particles, from 0.08 to 1 μm, in a diameter ratio of larger/finer of 1 to 20/1 and a weight ratio of 0.1 to 10/1. Similarly, when three seeding products are used, three populations are obtained, with average diameters ranging from 0.4 to 2.5 μm for the larger particles, from 0.15 to 1 μm for the medium ones and from 0.05 to 0.4 μm for the finer ones. The diameter ratios of large particles/medium particles and of medium particles/fine particles, which may be similar or different, range from 1 to 20/1, and the weight ratios of large particles/medium particles and of medium particles/fine particles, which may be similar or different, range from 0.1 to 20/1.

The diameters and weight ratios, within the above limits, are selected according to the conditions of use for the polymers formed, such as rheological properties of plastisols or suitability for extrusion.

The particles of different average diameters result from enlargement of the particles of seeding products. By application of present-day knowledge, the particles of seeding products containing initiator should undergo an enlargement as defined in French Pat. No. 1,485,547; on the other hand, enlargement should be zero for particles of seeding products not containing any initiator. Applicants have found the enlargement of particles containing an initiator to be less than expected, whereas particles not containing any initiator undergo an enlargement which is not negligible, yet which is proportionally less than that of particles containing an initiator; this enlargement complies neither with the law of enlargement covering polymerization in microsuspension nor with the law covering polymerization in emulsion.

The vinyl chloride polymers prepared by the method of the invention are separated from the polymerizing medium by any known methods such as filtration; coagulation and draining; scaling; centrifugal decantation; and atomization.

The invention also concerns the polymers thus obtained, which are in the form of powders particularly suitable for preparing plastisols having Newtonian or pseudoplastic behavior with a very low plasticizer content of up to 25 parts by weight of plasticizer per 100 parts by weight of polymer, and a low viscosity which enables coatings to be applied at very high speed.

The polymers and copolymers of the invention are applicable to the manufacture of sheets, films, threads, hollow bodies, cellular materials or articles molded by calendering, extrusion, blow extrusion, injection or casting; they may also be used to obtain coated coverings, cellular materials or articles molded by any known methods of using plastisols: coating, rotation molding or dipping (trempage).

Some examples will now be given by way of illustration and not by way of limitation of the invention:

EXAMPLE 1

Preparation of seeding latex 1 in microsuspension

The following are mixed:
40 kg of vinyl chloride,
0.6 kg of lauroyl peroxide,
4 kg of a 10% by weight aqueous solution of sodium dodecylbenzenesulphonate,
enough water to bring the vinyl chloride concentration to 43% by weight.

The mixture is homogenized to form a microsuspension which is then placed in a 120 liter autoclave. It is heated to 52° C. under autogenous pressure.

When the pressure has dropped, i.e. after 9 hours, the unreacted vinyl chloride is degassed. The latex is obtained with a polyvinyl chloride concentration of 40% by weight; its particles have an average diameter of 0.4 μm and contain 1.5% by weight of lauroyl peroxide relative to the polymer.

Preparation of seeding latex 2 in emulsion

The following are placed in a 120 liter autoclave:
60.6 kg of water,
2.60 kg of a 10% by weight aqueous solution of sodium tetradecylsulphonate,
0.053 kg of ammonia at 22° Baume,
52 kg of vinyl chloride.

The mixture is heated to 52° C. under autogenous pressure and this temperature is maintained throughout the operation. As soon as the mixture is at 52° C., 0.035 kg of potassium persulphate is introduced. 15 minutes later, 4.75 liters of a 10% aqueous solution of sodium tetradecylsulphonate is added continuously at a rate of 0.5 liter/hour. After 9½ hours at 52° C., the unreacted vinyl chloride is degassed. The latex obtained has a polymer concentration of 40.2% by weight and a particle diameter of 0.12 μm. The particles do not contain any initiator.

Polymerization

The following are placed in a 120 liter autoclave:
33.2 kg of water,
5.7 kg of latex 1, i.e. 2.3 kg of polyvinyl chloride containing 34.5 g of lauroyl peroxide,
3.5 kg of latex 2, i.e. 1.4 kg of polyvinyl chloride,
1.5 kg of a 10% by weight aqueous solution of sodium dodecylbenzene sulphonate,
55 kg of vinyl chloride.

The mixture is agitated, with the agitator at 50 revolutions/min. and heated to 52°C. 3 hours later, 2.5 kg of a 10% by weight aqueous solution of sodium dodecylbenzene sulphonate is added.

After 18 hours' reaction, a drop in pressure is observed. When the pressure has dropped 2 bars, the unreacted vinyl chloride is degassed. A latex is obtained with a polymer concentration of 54% by weight and a viscosity of 38 cp.

The weight of crusts in the autoclave is only 300 g.

Particle size analysis of the latex obtained shows the polymer to be made up of two populations of particles with average diameters of 0.20 μm and 0.98 μm respectively. An increase in the size of the particles of latex 2 is noted, although they do not contain any initiator. The fine particles represent 25% by weight of the polymer.

The latex obtained is atomized, the powder obtained crushed, and a plastisol prepared by mixing 100 parts by weight of polymer and 40 parts by weight of dioctyl phthalate. The rheological properties of the plastisol are measured:

firstly with the aid of a rotary rheometer of the Brookfield RTV type (needle No. 6, 20 revs/minute, measuring and conditioning at 25° C.); the results are given in table 1;

secondly with the aid of a Severs extrusion-type rheometer (conditioning 2 hours at 25° C.); the results are set out in table 2.

TABLE 1

| Brookfield Viscosity | |
|---|---|
| Conditioning at 25° C. hours | Viscosity poises |
| 0.5 | 210 |
| 24 | 440 |

The table shows that, although the plastisol contains little plasticizer, its viscosity is low and it develops slowly with the passage of time.

TABLE 2

| Severs Viscosity | |
|---|---|
| Speed gradient sec$^{-1}$ | Viscosity poises |
| 235 | 308 |
| 480 | 280 |
| 820 | 260 |

A study of the table reveals the surprising fact that the viscosity of the plastisol diminishes as the speed gradient increases; this is characteristic of a slight pseudoplasticity of the plastisol, which makes it easier to use.

A plastisol consisting of 50 parts by weight of dioctylphthalate per 100 parts by weight of polyvinyl chloride also has pseudoplastic behavior that is to say, viscosity diminishes as the speed gradient increases.

For purposes of comparison three tests are carried out, with one seeding latex, according to prior art.

Test A in which the procedure is as above, but with proportions of reagents such that a latex of similar concentration is obtained.

The following are placed in the reactor:
32.4 kg of water,
6.9 kg of latex 1, i.e. 2.75 kg of polyvinyl chloride,
1.5 kg of a 10% by weight aqueous solution of sodium dodecylbenzene sulphonate,
55 kg of vinyl chloride.

The reaction is carried out under the same conditions. The drop in pressure is observed after 18 hours. After degassing, a precipitated polymer is obtained in the reactor; it is impossible to recover this by conventional separating processes.

Test B carried out like test A but with an agitator speed of 30 revs/min. The drop in pressure is observed after 22 hours. The latex obtained has a polymer concentration of 54.5% by weight and a viscosity of 500 cp. The weight of crusts in the reactor is 2 kg.

Particle size analysis of the latex shows that there is only one population of particles, with an average diameter of 1.05 μm.

Atomization of the latex is difficult. The product obtained is crushed and two plasticols are prepared. The results are given in table 3.

TABLE 3

| PLASTISOL | | |
|---|---|---|
| PVC parts by weight | DOP parts by weight | Rheology |
| 100 | 40 | Impossible to put into paste form. A greatly dilatant, heterogeneous mastic is obtained. |

TABLE 3-continued

| PLASTISOL | | |
|---|---|---|
| PVC parts by weight | DOP parts by weight | Rheology |
| 100 | 50 | Severs Viscosity |
| | | Gradient sec$^{-1}$ / Viscosity poises |
| | | 138 / 520 |
| | | 187 / 770 |
| | | 255 / 860 |

Comparison of tests A and B and example 1 show the improvement provided by the method of the invention in obtaining latex with a high polymer concentration and low viscosity. It also shows that the products of the process give plastisols of greater fluidity for a low plasticizer content, enabling coatings to be applied at high speed.

Test C. If in text B, at high concentration, the proportion of initiator in the seed polymer is increased or an activating system added in order to increase the speed of the reaction, the reaction mixture becomes thermally unstable due to the poor coefficient of thermal exchange of the reactor under the conditions of agitation of the viscous medium. Control of the temperature of the reactor is thereby lost and the reaction races, giving a latex which is useless, the polymer not having the required molecular weight.

EXAMPLE 2

Seeding latices 1 and 2 from example 1 are used in polymerization.

Polymerization

The following are charged into a 120 liter autoclave:
28.6 kg of water,
5.7 kg of latex 1, i.e. 2.3 kg of polyvinyl chloride,
3.5 kg of latex 2, i.e. 1.4 kg of polyvinyl chloride,
1.5 kg of a 10% by weight aqueous solution of sodium dodecylbenzene sulphonate,
2.7 g of copper sulphate,
55 kg of vinyl chloride.

The reaction mixture is agitated, with the agitator at a speed of 50 revs/min, and heated to 52° C.

Continuous introduction of 0.4 liter/hour of a 0.68 g/liter aqueous solution of ascorbic acid is started as soon as the temperature reaches 52° C.

After 3 hours at 52° C., 2.5 kg of a 10% by weight aqueous solution of sodium dodecylbenzene sulphonate is added.

After 9 hours' reaction, a drop in pressure is observed. When pressure has dropped 2 bars, the addition of ascorbic acid is stopped and the unreacted vinyl chloride is degassed. A latex is obtained with a polymer concentration of 55% by weight and a viscosity of 40 cp.

The weight of crusts in the reactor is only 120 g.

Particle size analysis of the latex obtained shows the polymer to be made up of two polulations of particles. One constitutes 30% by weight of the polymer and the average diameter of the particles is 0.20 μm; the other has an average particle diameter of 1 μm and constitutes 70% by weight. The growth of the particles of latex 2 is noted, although they did not contain any initiator.

The latex is atomized and the polymer obtained is converted into 2 plastisols, respectively containing 40 and 50% by weight of dioctyl phthalate per 100 parts by weight of polymer.

The rheological properties of the first plastisol are set out in tables 4 and 5 and those of the second plastisol in table 6.

TABLE 4

| Brookfield Viscosity | |
|---|---|
| Conditioning at 25° C. hours | Viscosity poises |
| 0.5 | 180 |
| 24 | 300 |

TABLE 5

| Severs Viscosity | |
|---|---|
| Speed Gradient sec$^{-1}$ | Viscosity poises |
| 215 | 360 |
| 400 | 350 |
| 670 | 340 |

This plastisol has very slightly pseudoplastic behavior, as indicated by the decrease in viscosity with the speed gradient.

Comparison between tables 2 and 5, i.e. examples 1 and 2, shows that activation by the initiator has virtually no effect on rheological properties, it influences only the reaction speed.

TABLE 6

| Severs Viscosity | |
|---|---|
| Speed Gradient sec$^{-1}$ | Viscosity poises |
| 90 | 112 |
| 220 | 100 |
| 540 | 80 |

Comparative test D. Polymerization in emulsion.
Preparation of seeding latex 1 in emulsion.
The following are placed in a 120 liter autoclave:
61 kg of water,
0.053 kg of ammonia at 22° Baume,
2.6 kg of seeding latex 2 from example 1, i.e. 1,150 kg of polyvinyl chloride,
50 kg of vinyl chloride.

The mixture is then heated to 52° C. under autogeneous pressure and this temperature is maintained throughout the operation. As soon as the mixture is at 52° C., 0.035 kg of potassium persulphate is introduced and 15 minutes later a 10% by weight aqueous solution of sodium tetradecylsulphonate is added continuously at a rate of 0.55 liter/hour. After 9½ hours, the unreacted vinyl chloride is degassed. The latex obtained has a polymer concentration of 40.5% by weight with a particle diameter of 0.40 μm.

Polymerization

The following are placed in a 120 liter autoclave:
45 kg of water,
0.053 kg of ammonia at 22° C. Baume,
4.10 kg of latex 1, i.e. 1.67 kg of polyvinyl chloride,
2.55 kg of latex 2 from example 1, i.e. 1.02 kg of polyvinyl chloride,
40% kg of vinyl chloride.

The mixture is then heated to 52° C. under autogenous pressure and this temperature is maintained throughout the reaction. As soon as the mixture is at 52° C., 0.025 kg of potassium persulphate is introduced. 15 minutes later, 5 liters of a 10% by weight aqueous solution of sodium dodecylbenzene sulphonate is added continuously at a rate of 0.5 liter/hour.

After 10 hours' reaction, the unreacted vinyl chloride is degassed. The latex obtained has a polymer concentration of 42% by weight. The weight of crusts in the reactor is 500 g. Particle size analysis of the latex obtained shows the polymer to be made up of two populations of particles. One constitutes 39% by weight of the polymer, and the average diameter of its particles is 0.83 μm; the other has an average particle diameter of 0.34 μm and constitutes 61% by weight.

The latex is atomized, then converted into plastisol as in example 1.

The rheological properties are as follows:

TABLE 7

| Brookfield Viscosity | |
|---|---|
| Conditioning at 25° C. hours | Viscosity poises |
| 0.5 | 1800 |
| 24 | >2000 |

TABLE 8

| Severs Viscosity | |
|---|---|
| Speed Gradient sec$^{-1}$ | Viscosity poises |
| 105 | 2050 |
| 160 | 3100 |
| 190 | 4200 |

Comparison between example 2 and test D shows the very great difference in particle size between the latices obtained by polymerization in microsuspension and in emulsion, and consequently the difference between the rheological properties of plastisols formed from the polymers obtained from these latices.

EXAMPLES 3 to 9

Polymerization

In each of the examples, a 120 liter autoclave is used, in which there are placed:
a variable quantity of water,
5.7 kg of latex 1 from example 1, i.e. 2.3 kg of polyvinyl chloride,
a variable quantity of latex 2, the average diameters of the particles being different in each of the examples; the difference between the average diameters of the particles is obtained by varying the quantity of emulsifier used at the beginning of the preparation of latex 2 from example 1,
0.55 kg of a 10% by weight aqueous solution of sodium tetradecylsulphonate,
4 g of copper sulphate,
55 kg of vinyl chloride.

The procedure is the same as in example 2, except that 3.5 kg of the same solution of sodium tetradecylsulphonate is added during polymerization instead of the sodium dodecylbenzene sulphonate solution.

The variable data of the reaction and the results obtained are set out in table 9.

A study of the table shows the effect of the total quantity of seeding latices, the effect of the proportion of one of the seeding latices relative to the other, and the effect of the particle diameter of the latices on the formation of crusts during polymerization, and on the particle size of the latices obtained.

EXAMPLE 10

Example 2 is repeated, except that the quantity of water used for polymerization is 11.7 kg instead of 28.6 kg.

At the end of the reaction, the polymer concentration of the latex is 67% by weight and its viscosity is 60 cp. The weight of crusts in the autoclave is 240 g.

The latex contains particles, 29% by weight of which have an average diameter of 0.19 μm and 71% by weight of which have an average diameter of 1 μm.

The latex thus obtained is divided into two portions.
-The first portion is atomized under normal conditions at low temperature. The powder obtained is crushed and converted into plastisol by mixing of 40 parts of diactyl phthalate per 100 parts of powder.

The rheological properties of the plastisol, measured as in example 1, are summarized in tables 10 and 11.

TABLE 9

| Examples | | 3 | 4 | 5 | 6 | 6 | 8 | 9 |
|---|---|---|---|---|---|---|---|---|
| Polymerization: | | | | | | | | |
| Water | kg | 20.3 | 22.2 | 21.8 | 21.9 | 21.45 | 21.7 | 22.1 |
| Latex 2 40% | kg | 20.65 | 6.9 | 10.35 | 3.45 | 6.9 | 3.45 | 3.45 |
| i.e. PVC | kg | 8.25 | 2.75 | 4.125 | 1.37 | 2.75 | 1.37 | 1.37 |
| particle size | μm | 0.18 | 0.18 | 0.14 | 0.14 | 0.13 | 0.13 | 0.105 |
| Crusts | g | 350 | 300 | 300 | 250 | 200 | 300 | 250 |
| Properties of latex obtained: | | | | | | | | |
| Concentration | % | 55.7 | 60.8 | 55.3 | 60 | 56.9 | 58.8 | 56.6 |
| Viscosity | cp | 31 | 30 | 28 | 31 | 29 | 26 | 27 |
| Particle size | | | | | | | | |
| Particles 1 | μm | 0.98 | 1 | 0.98 | 1.01 | 0.95 | 1.02 | 1.02 |
| Particles 2 | μm | 0.26 | 0.306 | 0.24 | 0.26 | 0.19 | 0.21 | 0.15 |
| Content of particles 2 | % | 50 | 35 | 46 | 25 | 39 | 27 | 30 |

TABLE 10

| Brookfield Viscosity | |
|---|---|
| Conditioning at 25° C. hours | Viscosity poises |
| 0.5 | 220 |
| 24 | 460 |

TABLE 11

| Severs Viscosity | |
|---|---|
| Speed gradient sec$^{-1}$ | Viscosity poises |
| 243 | 313 |
| 500 | 302 |
| 830 | 272 |

This example shows the surprising fact that latices with a very high concentration and with low viscosity can be obtained without any crust formation.

The second portion of the latex is atomized at a higher temperature. The powder obtained has polyvinyl chloride particles with an average diameter of 113 μm, an apparent mass per unit volume of 0.69 g/ml and a viscosity index of 117.

100 parts by weight of the polymer, thus obtained, are mixed with 0.5 part by weight of calcium stearate, 4 parts by weight of a lead stabilizer and 4 parts by weight of titanium oxide. The composition is then studied with the aid of a BRABENDER extrusion recorder and a BRABENDER plastograph and compared with an identical composition prepared with a polyvinyl chloride obtained by mass polymerization, with a viscosity index of 101.

The results are set out in table 12.

TABLE 12

| | BRABENDER PLASTOGRAPH | | | BRABENDER EXTRUSION RECORDER | |
|---|---|---|---|---|---|
| POLYMER | Gelation time sec. | Gelation torque m/g | Flow rate kg/h | Power consumed by machine w | Diameter of extruded product mm |
| PVC in example | 60 | 3,900 | 1.73 | 273 | 2.31 |
| Mass PVC | 600 | 2,350 | 1.62 | 233 | 2.53 swelling |

The vinyl polychloride obtained by the method of the invention is found to gel more quickly, to be extruded slightly more rapidly and to show less swelling on emerging from the die than a polyvinyl chloride prepared by mass polymerization.

EXAMPLE 11

Seeding latex 1 in microsuspension is that prepared in example 1.

Preparation of seeding latex 2 in microsuspension

The procedure is the same as in example 1, preparation of seeding latex 1, except that 8 kg of a 10% by weight aqueous solution of sodium dodecyl benzene sulphonate is used instead of 4 kg, and 0.04 kg of lauroyl peroxide is used instead of 0.6 kg. There is very fine homogenization.

The particles of latex obtained have an average diameter of 0.12 μm and contain only 0.07% by weight of initiator.

Polymerization

The following are placed in a 120 liter autoclave:
28.6 kg of water,
5.7 kg of latex 1, i.e. 2.3 kg of polyvinyl chloride,
3.5 kg of latex 2, i.e. 1.4 kg of polyvinyl chloride containing only very little initiator, corresponding to 0.002% by weight of the monomer present,
2.7 g of copper sulphate,
1.5 kg of a 10% by weight aqueous solution of sodium dodecylbenzene sulphonate,
55 kg of vinyl chloride.

The reaction is carried out as in example 2. The polymer concentration of the latex obtained is 54% by weight and its viscosity is 60 cp. The weight of crusts is approximately 100 g.

The polymer is made up of two populations of particles with respective average diameters of 0.19 μm and 1 μm, the fine particles constituting 29% by weight.

An enlargement of the particles of latex 2 was noted although its initiator content was virtually zero.

EXAMPLE 12

Preparation of seeding latex 1 in microsuspension

The preparation of seeding latex 1 in example 1 is repeated, but with homogenization such that the particle size of the latex is 0.48 μm. The polymer concentration is 39.5% by weight and the particles contain 1.5% by weight, relative to the polymer, of lauroyl peroxide.

Preparation of seeding latex 2 in microsuspension

The preparation of seeding latex 1 in example 1 is repeated, with homogenization such that the particle size of the latex is 0.1 μm. The polymer concentration is 40% and the particles contain 1.5% by weight, relative to the polymer, of lauroyl peroxide.

Polymerization

The following are placed in a 120 liter reactor:
31.2 kg of water,
1.5 kg of a 10% aqueous solution of sodium dodecylbenzene sulphonate,
9.9 kg of latex 1, i.e. 3.9 kg of polyvinyl chloride,
6.35 kg of seeding latex 2, i.e. 2.5 kg of polyvinyl chloride,
55 kg of vinyl chloride.

The reaction mixture is agitated, heated to 52° C. under autogenous pressure and kept at that temperature throughout the reaction.

After 3 hours' reaction, 2.5 kg of a 10% by weight aqueous solution of sodium dodecylbenzene sulphonate is added to the mixture. The drop in pressure takes place after 12 hours' reaction. When it has dropped 2 bars, the unreacted vinyl chloride is degassed.

The polymer concentration of the latex obtained is 54% by weight. The weight of crusts is 500 g.

The two populations of particles forming the polymer have respective average diameters of 0.18 μm and 0.99 μm which constitute 29 and 71% of the weight.

EXAMPLE 13

Example 8 is repeated except that the following are used for polymerization:
16.4 kg of water,
52.25 kg of vinyl chloride and
2.75 kg of vinyl acetate.

The latex obtained has a concentration of 58.1% by weight and a viscosity of 40 cp. The weight of crusts is low, at 150 g. The polymer is made up of 22% by weight of particles with an average diameter of 0.22 μm and 78% by weight of particles with an average diameter of 1.05 μm.

The latex is atomized; the product obtained is a copolymer containing 3.6% by weight of vinyl acetate. The rheological properties of plastisols containing different quantities of dioctyl phthalate are given in table 13.

TABLE 13.

| DOP parts/100 of polymer | Brookfield Viscosity ½ hour | (poises) 1 day | Severs Speed gradient (sec$^{-1}$) | Viscosity (poises) |
|---|---|---|---|---|
| 40 | 280 | 660 | 100 | 700 |
| 50 | 100 | 220 | { 390 \\ 940 | { 390 \\ 240 |
| 60 | 30 | 35 | { 1000 \\ 2600 | { 70 \\ 58 |

A low viscosity plastisol, containing 40 parts by weight of dioctyl phthalate per 100 parts by weight of vinyl chloride/vinyl acetate copolymer is found to be obtained; this is impossible with previous processes.

EXAMPLE 14

Seeding latex 1 used is that from example 1.

Preparation of seeding latex 2 in emulsion.

The procedure is eactly the same as in example 1. The diameter of the particles obtained is 0.115 μm.

Polymerization

Example 2 is repeated.

At the end of the reaction, the concentration of the latex is 54.9% by weight and its viscosity is 40 cp. The weight of crusts in the autoclave is 150 g.

The polymer of the latex is made up of 69% by weight of particles with an average diameter of 0.98 μm and 31% by weight of particles with an average diameter of 0.19 μm.

Comparative tests E and F in emulsion with two seeding latices of the emulsion type.

Preparation of seeding latex 1 in emulsion.

The procedure is like that followed in preparing the seeding latex in comparative test D of example 2.

Preparation of seeding latex 2 in emulsion (e) The preparation of seeding latex 2 from example 1 is repeated, except that 1.04 kg of a 10% by weight aqueous solution of sodium tetradecylsulphonate is used instead of 2.6 kg, and no sodium tetradecylsulphonate is introduced during polymerization. The particle diameter of the latex obtained is 0.031 μm.

(f) The procedure is exactly the same as in (e). The particle diameter of the latex obtained is 0.025 μm.

Two polymerizations are carried out as follows, one with latex 2e and the other with latex 2f. The proportions are such that the weight ratio of the two populations of particles and the diameter of the largest particles in the latex to be obtained are close to those of the latex in example 14.

The following are charged into a 25 liter autoclave:
8000 g of deionized water,
seeding latices 1 and 2 in varying quantities
vinyl chloride in a quantity such that the weight of monomer and seeding polymer is 7000 g.

The mixture is agitated and heated to 52° C. As soon as the mixture reaches that temperature, 4 g of ammonium persulphate is introduced. One hour later, 2 liters of a 1.75% by weight aqueous solution of sodium dodecylbenzene sulphonate is introduced continuously at a rate of 0.23 liter/hour.

When pressure is at 5 bars, the unreacted monomer is degassed.

The operating data and results of tests E and F are summarized in table 14 and compared with examples 2 and 14.

A study of this table shows that a slight difference in the particle diameters of seeding latices 2 in polymerization in microsuspension results in virtually no differences in the particle size of the products obtained or in the rheological properties. On the other hand, an identical difference between the particle diameters of seeding latices 2 in polymerization in emulsion leads to significant differences in the particle size of the products obtained and consequently in their rheological properties. In this case there is no reproducibility of the process.

TABLE 14

|  |  |  | TESTS | | EXAMPLES | |
|---|---|---|---|---|---|---|
|  |  |  | E | F | 2 | 14 |
| Polymerization: | | | | | | |
| Latex 1 | diameter | μm | 0.40 | 0.40 | 0.40 | 0.40 |
|  | ratio Polymer / (Monomer + Polymer) % weight | | 4.4 | 4.4 | 3.92 | 3.92 |
| Latex 2 | diameter | μm | 0.031 | 0.025 | 0.12 | 0.115 |
|  | ratio Polymer / (Monomer + Polymer) % weight | | 0.20 | 0.20 | 2.4 | 2.4 |
| Products obtained: | | | | | | |
| Particle population 1 | diameter | μm | 0.96 | 0.96 | 1.00 | 0.98 |
|  | quantity | % | 68 | 68 | 70 | 69 |
| Particle population 2 | diameter | μm | 0.16 | 0.131 | 0.20 | 0.19 |
|  | quantity | % | 32 | 32 | 30 | 31 |
| Plastisols PVC/DOP 100/40 - Rheology: | | | | | | |
| Brookfield Viscosity | ½ hour | p | 200 | 280 | 180 | 200 |
|  | 1 day | p | 450 | 800 | 300 | 310 |
| Severs Viscosity | Speed gradient | sec$^{-1}$ | 240-520-810 | 260-410-620 | 215-400-670 | 200-410-660 |
|  | Viscosity | p | 320-315-297 | 410-430-462 | 360-350-340 | 380-360-340 |

EXAMPLE 15

Preparation of seeding latex 1 in microsuspension

The preparation of seeding latex 1 from example 1 is repeated with homogenization such that the average particle diameter of the latex is 0.25 μm. The polymer concentration of the latex obtained is 40% by weight and the particles contain 1.5% by weight, relative to the polymer, of lauroyl peroxide.

Preparation of seeding latex 2 in emulsion

Procedure is the same as in comparative test D in example 2, but with 0.43 kg, instead of 2.6 kg. of seeding latex 2 from example 1, i.e. 0.190 kg of polyvinyl chloride.

The latex obtained has a polymer concentration of 40% by weight, and the diameter of its particles is 0.74 μm.

Polymerization

The following are placed in a 120 liter autoclave:
52 kg of water,
4.95 kg of latex 1, i.e. 2 kg of polyvinyl chloride,
3.15 kg of latex 2, i.e. 1.25 kg of polyvinyl chloride,
1.5 kg of a 10% by weight aqueous solution of sodium dodecylbenzene sulphonate,
2.7 g of copper sulphate,
50 kg of vinyl chloride.

Polymerization is carried out in the same way as in example 2.

The latex obtained has a polymer concentration of 43% by weight. Particle size analysis shows it to contain two populations of elementary particles with respective average diameters of 0.88 μm and 0.52 μm, constituting 10 and 90% by weight of the polymer. This confirms the growth of the particles of the 2 seeding latices.

EXAMPLE 16

Preparation of seeding latex 1 in microsuspension

Preparation is the same as that of latex 1 in example 1.

Preparation of seeding latex 2 in emulsion

The preparation of seeding latex 2 from example 1 is repeated.

Preparation of seeding latex 3 in emulsion

The following are placed in a 120 liter autoclave:
65 kg of water,
2 kg of a 5% by weight aqueous solution of potassium laurate,
0.053 kg of ammonia at 22° Baume,
52 kg of vinyl chloride.

The mixture is then heated to 52° C. under autogenous pressure and this temperature is maintained throughout the operation. As soon as the mixture is at 52° C., 0.035 kg of potassium persulphate is introduced. After 9½ hours at 52° C., the unreacted vinyl chloride is degassed. The latex obtained has a polymer concentration of 40.2% by weight and a particle diameter of 0.2 μm. The particles do not contain any initiator.

Polymerization

The following are placed in a 120 liter autoclave:
33.2 kg of water,
5.7 kg of latex 1, i.e. 2.3 kg of polyvinyl chloride containing 34.5 g of lauroyl peroxide,
1.75 kg of latex 2, i.e. 0.7 kg of polyvinyl chloride,
1.5 kg of a 10% by weight aqueous solution of sodium dodecylbenzene sulphonate,
55 kg of vinyl chloride.

The reaction mixture is agitated, at an agitator speed of 50 revs/min and heated to 52° C. After 3 hours, 2.5 kg of a 10% by weight aqueous solution of sodium dodecylbenzene sulphonate is added.

After 18 hours reaction, a drop in pressure is observed. When the pressure has dropped 2 bars, the unreacted vinyl chloride is degassed. The latex obtained has a polymer concentration of 54% by weight and a viscosity of 25 cp.

The weight of crusts in the autoclave is only 300 g.

Particle size analysis of the latex obtained shows the polymer to be made up of three populations of particles, with respective average diameters of 0.16 μm, 0.40 μm and 0.97 μm, constituting respectively 16%, 20% and 64% of the weight of polymer.

Comparison between latex of example 16 and latex of example 1 shows that, for a same polymer concentration, the viscosities are different.

EXAMPLE 17

The seeding latex 1 used is that from example 1.

Preparation of seeding latex 2 in emulsion

The preparation of seeding latex 3 from example 16 is repeated.

Preparation of seeding latex 3 in emulsion

This is prepared like the seeding latex in comparative test D of example 2.

Polymerization

The following are placed in a 120 liter autoclave;
33.2 kg of water,
5.7 kg of latex 1, i.e. 2.3 kg of polyvinyl chloride containing 34.5 g of lauroyl peroxide,
10.5 kg of latex 2, i.e. 4.2 kg of polyvinyl chloride,
10.5 kg of latex 3, i.e. 4.2 kg of polyvinyl chloride,
1.5 kg of a 10% by weight aqueous solution of sodium dodecylbenzene sulphonate,
55 kg of vinyl chloride.

Polymerization is carried out as in example 16 and the latex obtained has a polymer concentration of 53% by weight and a viscosity of 45 cp.

The weight of crusts in the autoclave is only 320 g.

Particle size analysis shows the latex to contain three populations of elementary particles with respective average diameters of 0.26 μm, 0.54 μm and 0.92 μm constituting 22, 32 and 46% by weight of the polymer.

EXAMPLE 18

Seeding latices 1 and 2 for example 16 are used in polymerization.

Preparation of seeding latex 3 in emulsion

The preparation of seeding latex 2 from example 1 is repeated, but with 1.04 kg of a 10% by weight aqueous solution of sodium tetradecylsulphonate instead of 2.6 kg and without the introduction of sodium tetradecylsulphonate during polymerization. The particle diameter of the latex obtained is 0.031 μm.

Polymerization

This is done under the same conditions as in example 16.

The latex obtained has a viscosity of 22 cp and contains three populations of particles constituting 13, 22 and 65% by weight of the polymer, with respective average diameters of 0.067 μm, 0.19 μm and 0.97 μm.

EXAMPLE 19

Preparation of seeding latex 1 in microsuspension

The preparation of seeding latex 1 from example 1 is repeated.

Preparation of seeding latex 2 in emulsion

The following are placed in a 25 liter autoclave:
9.1 kg of water,
0.75 kg of seeding latex 3 of example 18, i.e. 0.3 kg of polyvinyl chloride.

These are agitated and heated to 75° C., and this temperature is maintained throughout the operation. As soon as the mixture is at 75° C., 12 g of potassium persulphate in solution in 100 g of water is introduced. 6 kg of butylacrylate and one liter of an aqueous solution containing 30 g of sodium pyrophosphate and 60 g of sodium dodecylbenzene sulphonate are then added simultaneously and continuously over three hours. After 8 hours, the reaction is stopped; the latex obtained has a polymer concentration of 33% by weight and an average particle diameter of 0.09 μm.

Polymerization

The procedure is as in example 1 but using 4.25 kg of latex 2 above, i.e. 1.4 kg of polymer.

The latex obtained has a concentration of 52% by weight and a viscosity of 40 cp.

The weight of crusts in the autoclave is only 400 g.

Particle size analysis of the latex obtained shows the polymer to be made up of two populations of particles with respective average diameters of 0.18 μm and 0.96 μm, the fine particles constituting 30% by weight.

I claim:

1. A method of preparing polymers of vinyl chloride, comprising:
    preparing an aqueous dispersion of polymers of vinyl chloride containing at least two populations of particles with different average diameters of less than 5 μm, with a polymer concentration of up to 75%, by polymerizing the corresponding monomer or monomers in microsuspension, without any complementary addition of initiator, with or without an emulsifier, in the presence of a first seeding product in the form of an aqueous dispersion of particles of a vinyl polymer, previously prepared by polymerization in microsuspension, the particles of which contain at least one initiator soluble in organic material, and one or more other seeding products in the form of aqueous dispersions of particles of vinyl polymer, the average diameters of which differ from one another and from the particles diameter of the first seeding product, at least one of these seeding products has particles substantially free of initiator and an average diameter less than the average diameter of the particles of the first seeding product, in which the particles of the first seeding product with initiator has an average diameter within the range of 0.05–1.5 μm;
    separating the polymer of vinyl chloride from the obtained aqueous dispersion.

2. The method as claimed in claim 1, in which the vinyl chloride polymer is polyvinyl chloride or a copolymer containing at least 50% by weight of vinyl chloride and at least one copolymerizable monomer.

3. The method as claimed in claim 1, in which the vinyl polymer is selected from the group consisting of homopolymers of vinyl chloride, copolymers of vinyl chloride with copolymerizable monomers, homopolymers of copolymerizable monomers and copolymers of said copolymerizable monomers together.

4. A method of preparing polymers of vinyl chloride, comprising:
    preparing an aqueous dispersion of polymers of vinyl chloride containing at least two populations of particles with different average diameters of less than 5 μm, with a polymer concentration of up to 75%, by polymerizing the corresponding monomer or monomers in microsuspension, without any complementary addition of initiator, with or without an emulsifier, in the presence of a first seeding product in the form of an aqueous dispersion of particles of a vinyl polymer, previously prepared by polymerization in microsuspension, the particles of which contain at least one initiator soluble in organic material and one or more other seeding products in the form of aqueous dispersions of particles of vinyl polymer, the average diameters of which differ from one another and from the particles diameter of the first seeding product, at least one of these seeding products has particles substantially free of initiator and an average diameter less than the average diameter of the particles of the first seeding product;

separating the polymer of vinyl chloride from the obtained aqueous dispersion, in which the formed dispersion contains three populations of particles with respective average diameters of from 0.4 to 2.5 $\mu$m, from 0.15 to 1 $\mu$m and from 0.05 to 0.4 $\mu$m, the diameter ratios of large particles/medium particles and medium particles/fine particles similar or different ranging from 1 to 20/1, and in weight ratios of large particles/medium particles and medium particles/fine particles, similar or different, ranging from 0.1 to 20/1.

5. The method as claimed in claim 1, in which the average diameter of the polymer particles of the first seeding product with initiator is from 0.05 to 1.5 $\mu$m, and in which the average diameter of the polymer particles of the seeding product without initiator is from 0.02–1.5 $\mu$m.

6. The method as claimed in claim 1, in which the average diameter of the polymer particles of the seeding product or products other than the first is from 0.02 to 0.8 $\mu$m.

7. The method as claimed in claim 1, in which the seeding product or products other than the first are prepared by polymerization in microsuspension, in the presence of an initiator soluble in organic material.

8. The method as claimed in claim 1, in which the seeding product or products other than the first are prepared by polymerization in emulsion, in the presence of a water-soluble initiator.

9. The method as claimed in claim 1, in which the total quantity of seeding products to be used is such that the quantity of polymers contained therein represents 1 to 50% by weight of the sum of vinyl chloride or mixture of vinyl chloride and copolymerizable monomer to be polymerized plus seeding polymers.

10. The method as claimed in claim 1, in which the ratio of the first seeding polymer to the other seeding polymers is from 95/5 to 5/95.

11. The method as claimed in claim 1, in which the concentration of seeding polymers plus the vinyl chloride or mixture of vinyl chloride and copolymerizable monomer is from 20 to 80% by weight of the reaction mixture, allowing for the water content of the seeding products.

12. A method of preparing polymers of vinyl chloride, comprising:

preparing an aqueous dispersion of polymers of vinyl chloride containing at least two populations of particles with different average diameters of less than 5 $\mu$m, with a polymer concentration of up to 75%, by polymerizing the corresponding monomer or monomers in microsuspension, without any complementary addition of initiator, with or without an emulsifier, in the presence of a first seeding product in the form of an aqueous dispersion of particles of a vinyl polymer, previously prepared by polymerization in microsuspension, the particles of which contain at least one initiator soluble in organic material, and one or more other seeding products in the form of aqueous dispersions of particles of vinyl polymer, the average diameters of which differ from one another and from the particles diameter of the first seeding product, at least one of these seeding products has particles substantially free of initiator and an average diameter less than the average diameter of the particles of the first seeding product;

separating the polymer of vinyl chloride from the obtained aqueous dispersion, in which an aqueous dispersion of polymers of vinyl chloride containing two populations of particles with respective average diameters from 0.4 to 2.5 $\mu$m and from 0.08 to 1 $\mu$m, in a diameter ratio from 1 to 20/1 and a weight ratio from 0.1 to 10/1 is prepared by polymerizing the corresponding monomer or monomers in microsuspension in the presence of a first seeding product in the form of an aqueous dispersion of particles of a vinyl polymer with an average diameter of from 0.05 to 1.5 $\mu$m, the particles of which contain at least one initiator soluble in organic material and one other seeding product in the form of an aqueous dispersion of particles of a vinyl polymer the average diameter of which differs from the particle diameter of the first seeding product and is from 0.02 to 1.5 $\mu$m.

13. A method of preparing polymers of vinyl chloride, comprising:

preparing an aqueous dispersion of polymers of vinyl chloride containing at least two populations of particles with different average diameters of less than 5 $\mu$m, with a polymer concentration of up to 75%, by polymerizing the corresponding monomer or monomers in microsuspension, without any complementary addition of initiator, with or without an emulsifier, in the presence of a first seeding product in the form of an aqueous dispersion of particles of a vinyl polymer, previously prepared by polymerization in microsuspension, the particles of which contain at least one initiator soluble in organic material, and one or more other seeding products in the form of aqueous dispersions of particles of vinyl polymer, the average diameters of which differ from one another and from the particles diameter of the first seeding product, at least one of these seeding products has particles substantially free of initiator and an average diameter less than the average diameter of the particles of the first seeding product;

separating the polymer of vinyl chloride from the obtained aqueous dispersion, in which an aqueous dispersion of polymers of vinyl chloride containing three populations of particles with respective average diameters of from 0.4 to 2.5 $\mu$m, from 0.15 to 1 $\mu$m and from 0.05 to 0.4 $\mu$m, the diameter ratios of large particles/medium particles and medium particles/fine particles similar or different, ranging from 0.1 to 20/1, and in weight ratios of large particles/medium particles and medium particles/fine particles, similar or different, ranging from 0.1 to 20/1 is prepared by polymerizing the corresponding monomer or monomers in microsuspension in the presence of a first seeding product in the form of an aqueous dispersion of particles of a vinyl polymer with an average diameter of from 0.05 to 1.5 μm, the particles of which contain at least one inititator soluble in organic material and two other seeding products in the form of aqueous dispersions of particles of a vinyl polymer the average diameters of which differ from one another and from the particles diameter of the first seeding product and are from 0.02 to 1.5 μm.

14. The method as claimed in claim 1, in which the polymerization speed is accelerated by activation of the initiator contained in the particles of seeding products, by a metal complex, formed in situ, which is soluble in organic material.

15. The method as claimed in claim 1 characterized in that their polymer concentration is from 20 to 75% by weight.

16. The method as claimed in claim 1 in which the two populations of particles have respective average diameters from 0.4 to 2.5 μm and from 0.08 to 1 μm, in a diameter ratio from 1 to 20/1 and a weight ratio from 0.1 to 10/1.

* * * * *